(12) United States Patent
Altintas et al.

(10) Patent No.: US 10,249,193 B2
(45) Date of Patent: Apr. 2, 2019

(54) HYBRID INTERFACE SELECTION FOR HETEROGENEOUS VEHICULAR COMMUNICATIONS

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Mountain View, CA (US)

(*) Notice: Subject to any disclaimer, the term of this patent is extended or adjusted under 35 U.S.C. 154(b) by 126 days.

(21) Appl. No.: 15/621,566

(22) Filed: Jun. 13, 2017

(65) Prior Publication Data

US 2018/0357902 A1     Dec. 13, 2018

(51) Int. Cl.

| | |
|---|---|
| *G08G 1/16* | (2006.01) |
| *H04W 4/02* | (2018.01) |
| *G01C 21/28* | (2006.01) |
| *G08G 1/01* | (2006.01) |
| *B60W 30/08* | (2012.01) |
| *H04W 84/12* | (2009.01) |
| *H04W 84/00* | (2009.01) |
| *H04W 84/04* | (2009.01) |
| *H04W 4/04* | (2009.01) |

(52) U.S. Cl.
CPC ............ *G08G 1/161* (2013.01); *B60W 30/08* (2013.01); *G01C 21/28* (2013.01); *G08G 1/0112* (2013.01); *H04W 4/046* (2013.01); *H04W 84/005* (2013.01); *H04W 84/042* (2013.01); *H04W 84/12* (2013.01)

(58) Field of Classification Search
CPC ..... G08G 1/161; G08G 1/0112; H04W 84/12; H04W 4/02; H04W 84/005; H04W 84/042; B60W 30/08; G01C 21/28
USPC ........................................................ 701/468
See application file for complete search history.

(56) References Cited

FOREIGN PATENT DOCUMENTS

JP     PO2011-015115     1/2011

*Primary Examiner* — Brian P Sweeney
(74) *Attorney, Agent, or Firm* — Burbage Law P.C.; Jon-Michael Burbage; Elizabeth Ruzich

(57) ABSTRACT

The disclosure includes embodiments for a vehicle to select one of a plurality of different interface types to use for a first time period. A method according to some embodiments includes analyzing probability data describing a set of expected channel loads for the plurality of different interface types to make an initial interface decision to designate a first interface type from the plurality as an interface type to use for sending and receiving wireless messages during the first time period. The method includes determining that the initial interface decision is invalid by analyzing load data describing a set of measured channel loads for the plurality. The method includes analyzing the load data to make an overriding interface decision to designate a second interface type from the plurality as the interface type to use for sending and receiving wireless messages during the first time period.

20 Claims, 7 Drawing Sheets

300

(B)

Analyze the measured channel loads to designate a different interface type as the overriding interface decision. In some embodiments, the interface type designated as the overriding interface decision is the interface type whose residual resource is greatest when compared to the residual resources of the other interface types included in the plurality of interface types (or whose channel load is least when compared to the channel loads of the other interface types included in the plurality of interface types).
321

Figure 3C

HYBRID INTERFACE SELECTION FOR HETEROGENEOUS VEHICULAR COMMUNICATIONS

BACKGROUND

The specification relates to hybrid interface selection for heterogeneous vehicular communications.

Connected vehicles have multiple types of network interfaces available to them. Different types of network interfaces have different characteristics relative to other types of network interfaces in terms of measurable network characteristics such as throughput, latency communication range, etc. There is no single network interface type that is good for all situations.

SUMMARY

A communication unit of a connected vehicle (herein, "the vehicle") includes hardware and software that are operable to provide a plurality of network interface types to the vehicle and the vehicle application included in the vehicle. The plurality of network interface types includes, for example, one or more of the following interface types: Dedicated Short Range Communication ("DSRC"); Long-Term Evolution ("LTE"); Long-Term Evolution Device-to-Device ("LTE-D2D"); millimeter-wave ("mmWave"); WiFi (infrastructure mode); WiFi (ad-hoc mode); visible light communication; television white space communication ("TV white space communication"); and satellite communication.

The vehicle includes different vehicle applications which request network usage. For example, the vehicle includes one or more different Advanced Driver Assistance Systems ("ADAS systems") having one or more ADAS-related vehicle applications and one or more different infotainment systems having one or more infotainment-related vehicle applications. Some or all of these vehicle applications request to send or receive communications via a wireless network which is accessible by the communication unit. These network usage requests require one of the plurality of network interfaces be selected for accommodating the network usage requests.

A vehicle application of an ADAS system is an example of a "safety application" because such vehicle applications generally provide safety or safety-related functionality to the vehicle. A vehicle application of an infotainment system is an example of a "infotainment application" because such vehicle applications generally provide infotainment or infotainment-related functionality to the vehicle.

The performance requirements for different network interface types are dependent on the individual vehicle applications which are requesting network usage. Reachability and timeliness of packet delivery are important performance requirements to consider when selecting a network interface for accommodating a network usage request from a safety application since an inability to reach the network or a delay in the transmission or receipt of packets for such requests may cause a risk to the safety of the vehicle and the passengers of the vehicle. Available bandwidth and network speed are important performance requirements to consider when selecting a network interface for accommodating a network usage request from an infotainment application since such requests are likely to require a large volume of packets to be transmitted in rapid succession.

The suitability of different network interface types also varies by geographical regions because of variations in the geographical features (and man-made structures) of these geographic regions, variations in the available network infrastructure within different geographic regions and variations in traffic patterns and network usage.

Heterogeneous vehicular networking is a functionality that includes seamlessly combining a plurality of different network interface types in a vehicle in such a way that the drawbacks of the different network interface types are minimized in terms of their detrimental effect and the overall performance of the vehicle's wireless communication capabilities is increased.

Described herein is an interface selection system which is operable to implement heterogeneous vehicular networking by selecting, from the plurality of network interfaces available from the communication unit, an optimum interface for use when accommodating a network usage request based on the performance requirements of the vehicle application that is requesting the network usage and the channel loads measured for the plurality of network interfaces.

In some embodiments, a server includes an interface optimizer system. The interface optimizer system receives load data and global positioning system data ("GPS data") from a plurality of vehicles over a period of time. The load data for a particular vehicle describes channel load measurements for one or more interface types for that particular vehicle and the GPS data describes the geographical location of that particular vehicle when the channel load measurements where recorded. The interface optimizer system includes code and routines that are operable, when executed by a processor of the server, to aggregate the load data and the GPS data received from the plurality of different vehicles to form "aggregated data." The interface optimizer system includes code and routines that are operable, when executed by the processor of the server, to cause the processor to analyze the statistical features of the aggregated data to determine optimized data. The optimized data describes, for each geographical region of an electronic road map, a recommended network configuration for any connected vehicle traveling within that geographical region. The recommended network configuration specifies or implies which network interface type a vehicle should use when traveling within a particular geographic region. In some embodiments, the recommended network configuration is implied or determinable based on statistical data included in the optimized data that describes the expected channel loads for different network interface types when traveling within a particular geographic region. The interface optimizer system includes code and routines that are operable, when executed by the processor of the server, to cause the processor to instruct a communication unit of the server to transmit the optimized data to one or more different vehicles via the wireless network.

Experience has shown that the recommended network configurations which are generated by the interface optimizer system are sometimes wrong. For example, the recommended network configuration may be based on a statistical analysis of the aggregated data indicating that a particular interface type will have an expected channel load which is equal to N amount of channel load (where N is a positive whole number), but in practice the measured channel load for the particular interface type is N−n amount of channel load (where n is a positive whole number which is less than N). This discrepancy between the expected channel load and the measured channel load creates situations where the recommended network configuration provided by the interface optimizer system results in situations where vehicle applications (e.g., safety applications and infotainment applications) do not have their performance requirements met, which may be trivial or annoying (as in the case for an infotainment application) or life threatening (as in the case for a safety application).

There are no existing solutions which evaluate the recommended network configurations for a geographic region and then provide an overriding network configuration if the recommended network configuration is determined to be incorrect as described in the preceding paragraph. However, the interface selection system described herein fulfills this need.

In some embodiments, a communication unit of the vehicle receives the optimized data from the wireless network. The communication unit stores the optimized data in a non-transitory memory that is accessible by a processor on the vehicle. The vehicle also includes the interface selection system. The interface selection system includes code and routines that are operable, when executed by the processor of the vehicle, to cause a DSRC-compliant GPS unit of the vehicle to retrieve GPS data that describes the geographical location of the vehicle and, optionally, the current time of day when the vehicle is located at this geographic location. The interface selection system includes code and routines that are operable, when executed by the processor of the vehicle, to cause the processor to retrieve time data from the non-transitory memory and analyze the time data to determine whether a designated time has elapsed since the last update of an interface selection for the vehicle. The time data describes the time when the last updated occurred and, optionally, the current time of day (in some embodiments, the current time of day is an element of the GPS data).

In some embodiments, the non-transitory memory of the vehicle stores region data that describes a plurality of geographic regions for a geographical area and a plurality of region identifiers, wherein each region identifier uniquely identifies one of the plurality of geographic regions for a geographic area and the plurality of region identifiers collectively identify each of the plurality of geographic regions for the geographic area. For example, a geographical area is divided into a plurality of non-overlapping geographic regions described by the region data, each geographic region having their own region identifier stored in the region data. In some embodiments, the region data is organized as a database or some other searchable data structure that is operable to receive a query including digital data describing a geographic location (e.g., the GPS data) and return a response to the query that includes a region identifier that uniquely identifies the geographic region which includes the geographic location described by the digital data included in the query. The interface selection system includes code and routines that are operable, when executed by the processor of the vehicle, to query the region data using the GPS data to retrieve a region identifier describing the current geographic region for the vehicle. The region identifier is digital data that describes the current geographic region of the vehicle based on the current GPS data of the vehicle.

In some embodiments, the non-transitory memory of the vehicle stores optimized data which was generated by the interface optimizer system of the server. The optimized data includes digital data that describes, for each geographic region included in a geographic area, the expected channel loads for the plurality of different interface types provided by the communication unit of the vehicle. Each geographic region has its own expected channel loads (which may or may not be different from other regions) for the plurality of different interface types. In some embodiments, the expected channel loads for each of the plurality of different interface types is expressed as probability data which is included in the optimized data. The probability data describes (1) an expected value for the channel load on a particular interface type and (2) a probability that this channel load will be observable in the real-world if the channel load for the particular interface type is measured in the real-world; the probability data describes this information for each of the plurality of different interface types on an individual basis and limited in scope such that it only applies while the vehicle is present in a particular geographic region. In some embodiments, the optimized data is organized as a database or some other data structure which is operable to receive a query including digital data describing a region identifier that uniquely identifies a geographic region where the vehicle is currently located and respond to this query with probability data that describes (1) the expected channel loads, $L_j(t)$, for each of the plurality of different interface types of the vehicle [where "t" indicates the current time of the vehicle] and, optionally, (2) the probability that these expected channel loads will actually be observable while the vehicle is present in the geographic region described by the region identifier included in the query. The interface selection system includes code and routines that are operable, when executed by the processor of the vehicle, to query the optimized data using the region identifier to retrieve the probability data for the geographic region described by the region identifier.

In some embodiments, the optimized data includes digital data describing a plurality of interface selection vectors which are identifiable based on a combination of: (1) the region identifier for the current geographic region; and (2) the current time for the vehicle. In these embodiments, the interface selection system includes code and routines that are operable, when executed by the processor of the vehicle, to query the optimized data using the region identifier and the current time to look up an interface selection vector included in the optimized data. The interface selection vector includes a set of load probabilities describing the expected channel loads for the plurality of different interface types of the vehicle.

In some embodiments, the interface selection system includes code and routines that are operable, when executed by the processor of the vehicle, to make an initial interface decision designating a particular interface type, k, as the interface which will be used to send and receive wireless messages during the current time period. The particular interface type, k, is labeled or described as the "initial interface decision," and this label or description indicates that the particular interface type is the "recommended network configuration" for the vehicle while the vehicle is present in the geographic region described by the region identifier. In other words, analysis of the probability data indicates that the particular interface type is the best interface to use for a current time period based on the information included in the probability data as determined by the interface optimizer system of the server, and as such the communication unit of the vehicle should be configured to send and receive wireless messages using this particular interface type and not the other interfaces included in the plurality of different interface types. However, as described above, experience indicates that this particular interface type may not always be the best interface to use when compared to the other interfaces included in the plurality of different interface types.

In some embodiments, the interface selection system includes code and routines that are operable, when executed by the processor of the vehicle, to retrieve: (1) load data describing the measured channel loads, L', for the plurality of different interface types at a time which is the same as or contemporaneous to the current time of the vehicle, t, which is described by the GPS data or the time data; and (2) a threshold, $\beta I_{kj}$, for the interface, k, designated by the initial interface decision. The threshold is stored as digital data on the non-transitory memory of the vehicle and retrieved by the processor. The interface selection system includes code and routines that are operable, when executed by the processor of the vehicle, to compare the measured channel loads for each of the plurality of different interface types to the expected channel loads, $L_j(t)$, for each of the plurality of different interface types to determine the values for one or more of the following: (1) the excess resource, $I'_k$, for the interface, k, designated by the initial interface decision; (2) the residual resources for the interfaces which are not designated by the initial interface decision; (3) the summed total for the residual resources; and (4) the summed total for the excess resource(s). See, for example, FIG. 1C.

In some embodiments, the interface selection system includes code and routines that are operable, when executed by the processor of the vehicle, to determine if both of the following are true: (1) the excess resource, $I'_k$, is greater than the threshold, $\beta I_{kj}$, such that the excess resource exceeds the threshold; and (2) the summed total for the residual resources are greater than the summed total for the excess resource(s). If both of these statements are not true, then the interface, k, is used during the time period because the probability data was sufficiently correct. If both of these statements are true, then an overriding interface decision is made to select a different interface to use during the time period because, for example, the probability data was not sufficiently correct. The selected interface is designated as the "overriding interface decision," which is a label that indicates that the selected interface will be used during the current time period instead of the interface which was labeled as the "initial interface decision." In some embodiments, the interface selected as the overriding interface decision is the interface whose residual resource is greatest when compared to the other residual resources for the plurality of different interface types. See, for example, FIG. 1C. For example, in some embodiments the interface selection system includes code and routines that are operable, when executed by the processor of the vehicle, to compare the residual resources of the plurality of different interface types who have residual interfaces to make an overriding interface decision designating the interface having the greatest residual resource as the interface to be used to send and receive wireless messages during current time period.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for a vehicle including a plurality of different interface types for sending and receiving wireless messages for a first time period, the method including: analyzing, by a processor of the vehicle, probability data describing a set of expected channel loads for the plurality of different interface types of the vehicle to make an initial interface decision to designate a first interface type from the plurality of different interface types as an interface type to use for sending and receiving wireless messages during the first time period; determining that the initial interface decision is invalid by analyzing load data describing a set of measured channel loads for the plurality of different interface types where the analysis of the load data indicates that the initial interface decision is invalid because a measured channel load for the first interface type is greater than an expected channel load for the first interface type by a value that exceeds a threshold amount for the value; and responsive to the initial interface decision being determined to be invalid, analyzing the load data to make an overriding interface decision to designate a second interface type from the plurality of different interface types as the interface type to use for sending and receiving wireless messages during the first time period. Other embodiments of this aspect include corresponding computer systems, apparatus, and computer programs recorded on one or more computer storage devices, each configured to perform the actions of the methods.

Implementations may include one or more of the following features. The method where the probability data is determined by a computer system which is not an element of the vehicle based on past channel loads for the plurality of different interface types as experienced by a plurality of different vehicles over a second time period which does not include the first time period. The method where the set of measured channel loads are measured during the first time period which is not included in the second time period. The method where each step of the method is executed by an onboard unit of the vehicle which includes the processor. The method where the threshold amount for the value is variable based on a current geographical location of the vehicle. The method where the probability data is variable based on a current geographical location of the vehicle. The method where each step of the method is executed consecutively. The method further including transmitting a wireless message to an endpoint using the second interface type during the first time period. Implementations of the described techniques may include hardware, a method or process, or computer software on a computer-accessible medium.

One general aspect includes a system including an onboard unit of a vehicle including a non-transitory memory storing computer code which, when executed by the onboard unit causes the onboard unit to: analyze probability data describing a set of expected channel loads for a plurality of different interface types of the vehicle to make an initial interface decision to designate a first interface type from the plurality of different interface types of the vehicle as an interface type to use for sending and receiving wireless messages during a first time period; determine that the initial interface decision is invalid by analyzing load data describing a set of measured channel loads for the plurality of different interface, where the analysis of the load data indicates that the initial interface decision is invalid because a measured channel load for the first interface type is greater than an expected channel load for the first interface type by a value that exceeds a threshold amount for the value; and analyze the load data to make an overriding interface decision to designate a second interface type from the plurality of different interface types of the vehicle as the interface type to use for sending and receiving wireless messages during the first time period. Other embodiments of this aspect include corresponding computer systems, apparatus, and computer programs recorded on one or more computer storage devices, each configured to perform the actions of the methods.

Implementations may include one or more of the following features. The system where the probability data is determined by a computer system which is not an element of the vehicle based on past channel loads for the plurality of different interface types as experienced by a plurality of different vehicles over a second period of time which does not include the first time period. The system where the set of measured channel loads are measured during the first time period which is not included in the second period of time. The system where the computer system is a server which is communicatively coupled to the vehicle by a network and the server periodically updates the probability data. The system where the threshold amount for the value is variable based on a current geographical location of the vehicle. The system where the probability data is variable based on a current geographical location of the vehicle. The system further including transmitting a wireless message to an endpoint using the second interface type during the first time period. Implementations of the described techniques may include hardware, a method or process, or computer software on a computer-accessible medium.

One general aspect includes a computer program product including a non-transitory memory of an onboard vehicle computer system of a vehicle storing computer-executable code that, when executed by the onboard vehicle computer system, causes the onboard vehicle computer system to: analyze probability data describing a set of expected channel loads for a plurality of different interface types of the vehicle to make an initial interface decision to designate a first interface type from the plurality of different interface types of the vehicle as an interface type to use for sending and receiving wireless messages during a first time period; determine that the initial interface decision is invalid by analyzing load data describing a set of measured channel loads for the plurality of different interface types of the vehicle, where the analysis of the load data indicates that the initial interface decision is invalid because a measured channel load for the first interface type is greater than an expected channel load for the first interface type by a value that exceeds a threshold amount for the value; and analyze the load data to make an overriding interface decision to designate a second interface type from the plurality of different interface types of the vehicle as the interface type to use for sending and receiving wireless messages during the first time period. Other embodiments of this aspect include corresponding computer systems, apparatus, and computer programs recorded on one or more computer storage devices, each configured to perform the actions of the methods.

Implementations may include one or more of the following features. The computer program product where the probability data is determined by a computer system which is not an element of the vehicle based on past channel loads for the plurality of different interface types as experienced by a plurality of different vehicles over a second time period which does not include the first time period. The computer program product where the set of measured channel loads are measured during the first time period which is not included in the second time period. The computer program product where the computer system is a server which is communicatively coupled to the vehicle by a network and the server periodically updates the probability data. The computer program product where the probability data is variable based on a current geographical location of the vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A-3C are example flow diagram of a method for making a hybrid interface selection based on (1) probability data describing past channel loads for a plurality of different interface types as experienced by a plurality of different vehicles over an extended period of time and (2) load data describing the current measured channel load for the plurality of different interface types of a particular vehicle, according to some embodiments.

DETAILED DESCRIPTION

A connected vehicle (herein "a vehicle") includes a communication unit that includes any hardware and software necessary to provide a plurality of different network interface types to the vehicle and a vehicle application included in the vehicle. The plurality of different network interface types includes, for example, one or more of the following interface types: DSRC; LTE; LTE-D2D; mmWave; WiFi (infrastructure mode); WiFi (ad-hoc mode); TV white space communication; and satellite communication.

Probability data may indicate that a particular one of the plurality of different interface types will be used by the vehicle to send and receive wireless messages during a particular time period; this is referred to as an "initial interface decision." Described herein are embodiments of an interface selection system of a vehicle. The interface selection system beneficially reviews the accuracy of the probability data (or the suitability of the initial interface decision for the vehicle in the current real-world context of the vehicle) based on, for example, (1) a comparison of the current measured load data for the plurality of different interface types versus the expected channel loads described by the probability data and (2) a threshold which limits how much deficit can exist between the expected channel load for the interface type selected to be used by the vehicle to send and receive wireless messages during the particular time period and the measured channel load for this interface type which was selected during the initial interface decision. If the probability data is determined to be insufficiently accurate by the interface selection system, then the interface selection system identifies a new interface type as the interface to be used by the vehicle to send and receive wireless messages during the particular time period; this is referred to as an "overriding interface decision." A hybrid interface selection is a method for selecting an interface type for a vehicle to use for sending and receiving wireless messages during a time period, wherein the method includes both (1) the initial interface decision and (2) the overriding interface decision.

Figure 1A:
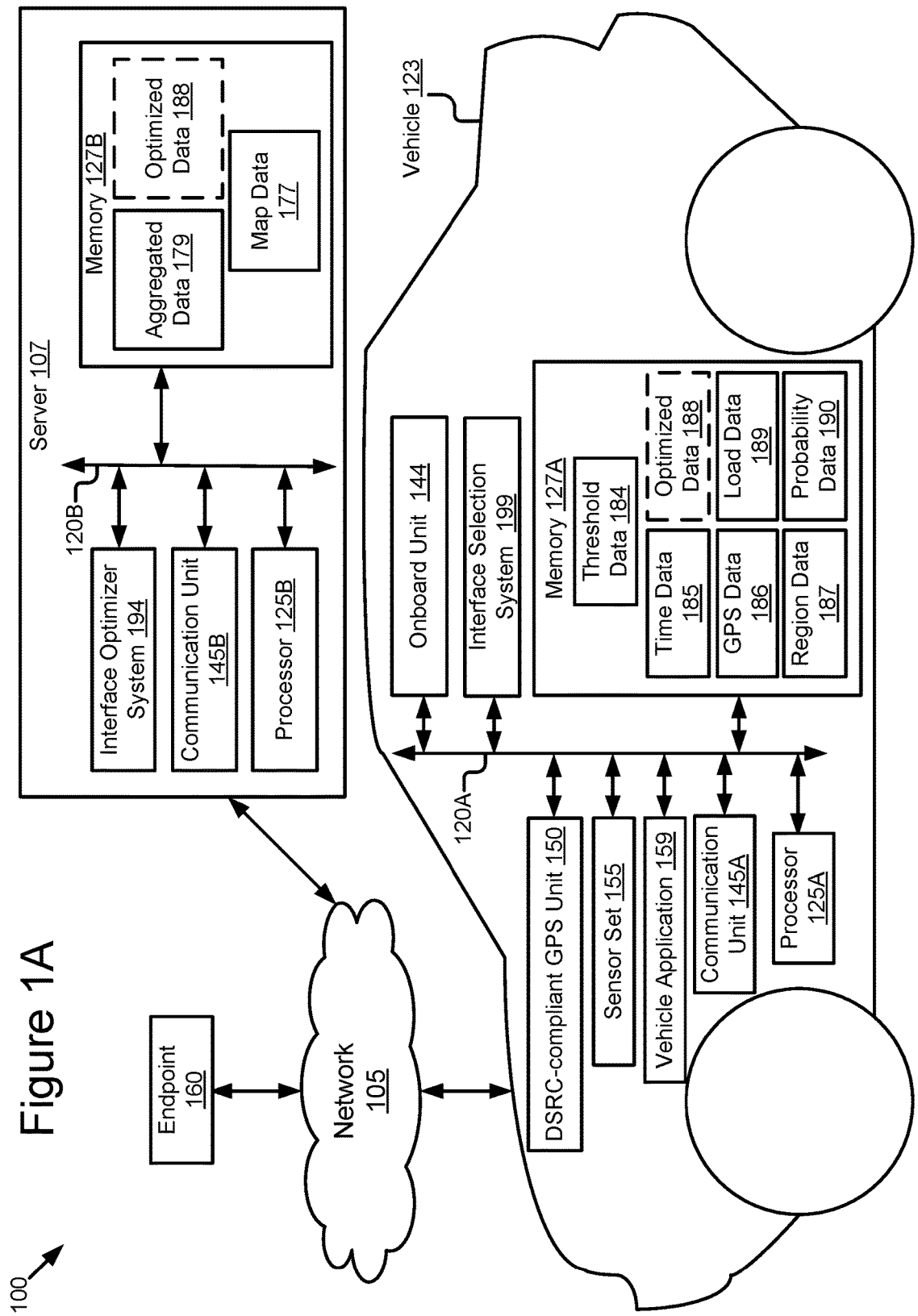
FIG. 1A is a block diagram illustrating an operating environment for an interface selection system of a vehicle according to some embodiments.

Referring to FIG. 1A, depicted is an operating environment 100 for an interface selection system 199 of a vehicle 123 according to some embodiments. The vehicle 123 is a connected vehicle. The operating environment 100 may include one or more of the vehicle 123, a server 107 and an endpoint 160. These elements may be communicatively coupled to one another via a network 105. Although one vehicle 123, one server 107, one endpoint 160 and one network 105 are depicted in FIG. 1A, in practice the operating environment 100 may include one or more vehicles 123, one or more servers 107, one or more endpoints 160 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the vehicle 123 is a DSRC-equipped vehicle. The network 105 may include one or more communication channels shared among the vehicle 123 and the server 107. The communication channel may include DSRC, LTE, LTE-D2D, mmWave, WiFi (infrastructure mode), WiFi (ad-hoc mode), visible light communication, TV white space communication, satellite communication, full-duplex wireless communication or any other wireless communication protocol such as those mentioned above.

The vehicle 123 is any type of vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes a set of ADAS systems which provide autonomous features to the vehicle 123 which are sufficient to render the vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle ("HAV") is an autonomous vehicle that is Level 3 or higher.

Accordingly, in some embodiments the vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle 123 includes one or more of the following elements: a processor 125A; a memory 127A; a communication unit 145A; a DSRC-compliant GPS unit 150; a sensor set 155; a vehicle application 159; an onboard unit 144; and an interface selection system 199. These elements of the vehicle 123 are communicatively coupled to one another via a bus 120A.

The server 107 is a processor-based computing device. For example, the server 107 may include one or more of the following types of processor-based computing devices: a personal computer; a laptop; a mainframe; or any other processor-based computing device that is operable to function as a server. The server 107 may include a hardware server.

The endpoint 160 is a processor-based computing device which is operable to send messages to the vehicle 123 via the network 105 and receive messages from the vehicle 123 via the network 105. For example, the endpoint 160 is another vehicle including elements similar to the vehicle 123, another server including elements similar to the server 107, a smartphone, a laptop, a roadside unit, etc.

In some embodiments, the server 107 includes one or more of the following elements: a processor 125B; a memory 127B; a communication unit 145B; and an interface optimizer system 194. These elements of the server 107 are communicatively coupled to one another via a bus 120B.

The processor 125A of the vehicle 123 and the processor 125B of the server 107 may be referred to herein collectively or individually as the "processor 125" since, for example, the processor 125A of the vehicle 123 provides similar functionality to the components of the vehicle 123 as does the processor 125B of the server 107. For similar reasons, the description provided herein uses the following terms when referring to elements that are common to the vehicle 123 and the server 107: the "memory 127" when referring to the memory 127A and the memory 127B, collectively or individually; and the "communication unit 145" when referring to the communication unit 145A and the communication unit 145B, collectively or individually.

The vehicle 123 and the server 107 are now described.

Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the interface selection system 199. The onboard vehicle computer system may be operable to access and execute the data stored on the memory 127 to provide the functionality described herein for the interface selection system 199 or its elements (see, e.g., FIG. 2). The onboard vehicle computer system may be operable to execute the interface selection system 199 which causes the onboard vehicle computer system to execute one or more of the steps of the method 300 described below with reference to FIGS. 3A and 3B.

In some embodiments, the processor 125 and the memory 127 may be elements of onboard unit 144. The onboard unit 144 includes an electronic control unit (herein "ECU") or onboard vehicle computer system that may be operable to cause or control the operation of the interface selection system 199. The onboard unit 144 may be operable to access and execute the data stored on the memory 127 to provide the functionality described herein for the interface selection system 199 or its elements. The onboard unit 144 may be operable to execute the interface selection system 199 which causes the onboard unit 144 to execute one or more of the steps of the method 300 described below with reference to FIGS. 3A and 3B. In some embodiments, the computer system 200 depicted in FIG. 2 is an example of an onboard unit 144.

In some embodiments, the DSRC-compliant GPS unit 150 includes any hardware and software necessary to make the vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 186 describing the location of vehicle 123 with lane-level accuracy. For example, the vehicle 123 is traveling on a roadway of a roadway environment. Lane-level accuracy means that the location of the vehicle 123 is described by the GPS data 186 so accurately that the vehicle's 123 lane of travel may be accurately determined based on the GPS data 186. In the context of the interface selection system 199, lane-level accuracy enables the interface selection system 199 to more accurately determine which geographic region the vehicle 123 is traveling in for cases where the vehicle 123 is located at a position which is plus or minus 10 meters from a border separating two neighboring geographic regions. This is because "lane-level accuracy" means that GPS data is accurate to within plus or minus 1.5 meters, as described in more detail below.

In some embodiments, the DSRC-compliant GPS unit 150 includes hardware that wirelessly communicates with a GPS satellite to retrieve GPS data 186 that describes the geographic location of the vehicle 123 with a precision that is compliant with the DSRC standard. The DSRC standard requires that GPS data 186 be precise enough to infer if two vehicles (one of which is, for example, the vehicle 123) are in the same lane at the same time. The lane may be a lane of a roadway. In some embodiments, the DSRC-compliant GPS unit 150 is operable to identify, monitor and track its two-dimensional position within 1.5 meters of its actual position 68% of the time under an open sky. Since lanes of a roadway are typically no less than 3 meters wide, whenever the two-dimensional error of the GPS data 186 is less than 1.5 meters the interface selection system 199 described herein may analyze the GPS data 186 provided by the DSRC-compliant GPS unit 150 and determine what lane of the roadway the vehicle 123 is traveling in based on the relative positions of two or more different vehicles (one of which is, for example, the vehicle 123) on the roadway at the same time.

By comparison to the DSRC-compliant GPS unit 150, a conventional GPS unit which is not compliant with the DSRC standard is unable to determine the location of a vehicle 123 with lane-level accuracy. For example, a typical lane of a roadway is approximately 3 meters wide. However, a conventional GPS unit only has an accuracy of plus or minus 10 meters relative to the actual location of the vehicle 123. As a result, such conventional GPS units are not sufficiently accurate for use by the interface selection system 199 in some embodiments since they would not enable the interface selection system 199 to generate or receive a region identifier that accurately reflects which geographic region the vehicle 123 is currently located in for cases where the vehicle 123 is located at a position which is plus or minus 10 meters from a border separating two neighboring geographic regions as described herein.

The sensor set 155 may include one or more sensors that are operable to measure the physical environment outside of the vehicle 123. For example, the sensor set 155 may include one or more sensors that record one or more physical characteristics of the physical environment that is proximate to the vehicle 123. The memory 127 may store sensor data that describes the one or more physical characteristics recorded by the sensor set 155. The sensor data may be used by the interface selection system 199 to confirm or deny the GPS data 186 or other data stored in the memory 127. For example, the GPS data 186 may indicate that the vehicle 123 is located near a particular landmark, and the sensor data may include an image that includes the particular landmark, thereby confirming the accuracy of the GPS data 186.

In some embodiments, the sensor set 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The vehicle application 159 includes code and routines for an ADAS application or an infotainment application of the vehicle 123. For example, the vehicle 123 includes an ADAS system, and the vehicle application 159 is software that is a component of the ADAS system. The vehicle application 159 generates requests for network usage. For example, the vehicle application 159 requests to send or receive data via the network 105 in order to provide the functionality of the vehicle application 159. For example, the vehicle application 159 is an infotainment application, and the vehicle application 159 requests to stream music data (or some other infotainment data) from the network 105 in order to provide a streaming music service (or some other infotainment service) to the driver of the vehicle 123. In another example, the vehicle application 159 is an ADAS application and the vehicle application 159 requests to download weather data (or some other digital data that is an input to the ADAS application) from the network 105 in order to provide ADAS functionality to the vehicle 123.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The vehicle 123 may include one or more memories 127.

The memory 127 of the vehicle 123 stores one or more of the following elements: time data 185; threshold data 184; GPS data 186; region data 187; optimized data 188; load data 189; and probability data 190. The optimized data 188 is depicted with a dashed line in FIG. 1A to indicate that the optimized data 188 may be an element of the server 107 or the vehicle 123. For example, as described below, the interface optimizer system 194 of the server generates the optimized data based on the aggregated data 179 (which is generated in part based on the load data 189 received from a plurality of vehicles such as the vehicle 123) and transmits the optimized data 188 to the vehicle 123 via the network 105.

The time data 185 is digital data that describes one or more of the following: (1) a time when the interface selection was last updated; (2) a current time of the vehicle 123; and (3) a designated time interval which elapses before the interface selection is updated. For example, the interface selection system 199 includes code and routines that are operable, when executed by the processor 125 of the vehicle 123, to compare the digital data describing the current time of the vehicle 123 to the time when the interface was last updated and the designated time interval to determine whether the designated time interval has elapsed since the interface selection was last updated. In some embodiments, the current time of the vehicle 123 is described by the GPS data 186.

The GPS data 186 is digital data that describes one or more of the following: (1) a location of the vehicle 123; and (2) a current time of the vehicle 123. In some embodiments, the GPS data 186 describes the location of the vehicle with lane-level precision. For example, the GPS data 186 is received from the DSRC-compliant GPS unit 150 and describes the current location of the vehicle 123 with such precision that the location of the vehicle 123 within a particular lane of a roadway is identifiable based on the GPS data 186.

The region data 187 is digital data describing a plurality of geographic regions for a geographical area and a plurality of region identifiers for the plurality of geographic regions. The region identifiers described by the region data 187 are the same as those described below with reference to the map data 177.

In some embodiments, each region identifier is digital data uniquely identifying one of the plurality of geographic regions for the geographic area and the plurality of region identifiers collectively identify each of the plurality of geographic regions for the geographic area. For example, a geographical area is divided into a plurality of non-overlapping geographic regions described by the region data, with each geographic region having their own region identifier stored in the region data.

In some embodiments, the region data 187 is organized as a database or some other searchable data structure that is operable to (1) receive a query including digital data describing a geographic location (e.g., the GPS data 186) and (2) return a response to the query that includes a region identifier that uniquely identifies the geographic region which includes the geographic location described by the digital data included in the query. The interface selection system 199 includes code and routines that are operable, when executed by the processor 125 of the vehicle 123, to query the region data 187 using the GPS data 186 to retrieve a region identifier describing the current geographic region for the vehicle 123. The region identifier corresponds to the geographic location described by the GPS data 186 because the region identified by the region identifier includes the geographic location described by the GPS data 186. The region identifier is digital data that describes the current geographic region of the vehicle 123 based on the current GPS data 186 of the vehicle 123.

The optimized data 188 includes digital data that describes, for each geographic region within a geographic area, the expected channel loads for the plurality of different interface types provided by the communication unit 145 of the vehicle 123. Within the optimized data 188, each geographic region of the geographic area is described as having its own expected channel loads (which may or may not be different from the expected channel loads for other geographic regions) for the plurality of different interface types.

In some embodiments, the expected channel loads for a geographic region is expressed as probability data 190 which is included in the optimized data 188. The probability data 190 describes (1) an expected value for the channel load for a particular interface type and, optionally, (2) a probability that the expected value for the channel load will be observable in the real-world if the channel load for the particular interface type is measured in the real-world; the probability data 190 describes this information for each of the plurality of different interface types on an individual basis and limited in scope such that the probability data 190 only applies while the vehicle 123 is present in a particular geographic region.

In some embodiments, the optimized data 188 is organized as a database or some other data structure which is operable to receive a query including digital data describing a region identifier that uniquely identifies a geographic region where the vehicle 123 is currently located and respond to this query with an instance of probability data 190 selected from the optimized data 188 that describes: (1) the expected channel loads for each of the plurality of different interface types of the vehicle 123; and, optionally, (2) the probability that these expected channel loads will actually be observable while the vehicle 123 is present in the geographic region described by the region identifier included in the query. The load data 189 described below describes the actually observable channel loads for the plurality of different interface types. The interface selection system 199 includes code and routines that are operable, when executed by the processor 125 of the vehicle 123, to query the optimized data 188 using the region identifier to retrieve the probability data 190 for the geographic region described by the region identifier.

The load data 189 is digital data that describes one or more measured channel loads for the plurality of different interface types of the vehicle 123. In some embodiments, the load data 189 is measured at a time that is the same as or cotemporaneous to the current time of the vehicle 123 which is described by the GPS data 186 or the time data 185.

In some embodiments, the optimized data 188 includes digital data describing a plurality of interface selection vectors which are identifiable based on a combination of: (1) the region identifier for the current geographic region, j; and (2) the current time, t, for the vehicle 123. In these embodiments, the interface selection system 199 includes code and routines that are operable, when executed by the processor 125 of the vehicle 123, to query the optimized data 188 using the region identifier and the current time to look up an interface selection vector included in the optimized data 188. The interface selection vector, $S_j(t)$, includes a set of load probabilities describing the expected channel loads, $L_j(t)$, for the plurality of different interface types of the vehicle 123.

The threshold data 184 is digital data that describes a threshold which is used for evaluating the accuracy of the probability data 190 for the current context of the vehicle 123. The threshold describes, for example, a maximum deficit which an interface type can have in terms of the expected channel load for the interface type as described by the probability data 190 versus the measured channel load for this interface type as described by the load data 189. See, for example, FIG. 1C.

In some embodiments, each interface type has its own threshold described by the threshold data 184. In some embodiments, the threshold for each channel varies from geographical region to geographical region. For example, the threshold for a particular interface type is determine by multiplying the expected channel load for a particular interface type, as described by the probability data 190 for a particular geographical region, by a system constant, (3, which is described by the threshold data 184. See, for example, FIG. 1C and the description of the conditions where the overriding interface decision is made to designate the second interface type 163 as the interface type to use for sending and receiving wireless messages.

The communication unit 145 transmits and receives data to and from a network 105 or to another communication channel. For example, the communication unit 145 includes any hardware or software necessary to enable the communication unit 145 to send and receive wireless messages via one or more of the following interface types (herein referred to as the "plurality of different interface types"): DSRC; LTE; LTE-D2D; mmWave; WiFi (infrastructure mode); WiFi (ad-hoc mode); visible light communication; TV white space communication; and satellite communication.

In some embodiments, the communication unit 145 is configured or made operable so that the operation of the communication unit 145 is controlled at least in part by the interface selection system 199. For example, the interface selection system 199 is operable to cause the communication unit 145 to measure, record and provide the load data 189 and the communication unit 145 is operable to follow the instruction of the interface selection system 199 to measure, record and provide the load data 189 to the interface selection system 199 or the memory 127. In another example, the interface selection system 199 is operable to configure which of the plurality of different interface types the communication unit 145 will use for sending and receiving wireless messages and the communication unit 145 is operable to operate in conformance with the configuration provided by the interface selection system 199.

In some embodiments, the communication unit 145 includes a DSRC transceiver, a DSRC receiver and other hardware or software necessary to make the vehicle 123 (or some other device such as the server 107) a DSRC-enabled device such as a DSRC-enabled vehicle.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The onboard unit 144 is a vehicular processor-based computing device. For example, the onboard unit 144 is an onboard vehicle computer system or an ECU of the vehicle 123. In some embodiments, the onboard unit 144 is a special-purpose computing device which is operable to execute the interface selection system 199. In some embodiments, the interface selection system is an element of the onboard unit 144. For example, see FIG. 1B.

In some embodiments, the interface selection system 199 includes code and routines that are operable, when executed by the processor 125, to cause the processor 125 to execute one or more of the steps of the method 300 described below with reference to FIGS. 3A-3C.

In some embodiments, the interface selection system 199 includes code and routines that are operable, when executed by the processor 125, to cause the processor 125 to analyze an instance of the probability data 190 selected from the optimized data 188 based on the current GPS data 186 for the vehicle 123 to make an initial interface decision which designates a particular interface type from the plurality of different interface types for the communication unit 145 to use when sending and receiving wireless messages during the current time period.

In some embodiments, the interface selection system 199 includes code and routines that are operable, when executed by the processor 125, to cause the processor 125 to review the accuracy of the probability data 190 (or the suitability of the initial interface decision in a current real-world context of the vehicle 123) based on, for example, (1) a comparison of the current measured load data 189 for the plurality of different interface types provided by the communication unit 145 versus the expected channel loads for the plurality of different interface types described by the probability data 190 and (2) the threshold, described by the threshold data 184, which limits how much deficit can exist between the expected channel load for the interface type selected to be used by the communication unit 145 to send and receive wireless messages during the current time period (i.e., the "initial interface decision") and the measured channel load for this interface type as indicated by the load data 189 (which is an example of the current real-world context of the vehicle 123). If the probability data 190 is determined to be insufficiently accurate based on this comparison (which would mean that the initial interface decision is not suitable for the current real-world context of the vehicle 123), then the interface selection system 199 includes code and routines that, when executed by the processor 125, causes the processor 125 to make a "overriding interface decision" which designates a different interface type to be used by the communication unit 145 to send and receive wireless messages during the particular time period. In some embodiments, the process of reviewing the accuracy of the probability data 190 (or the suitability of the initial interface decision) is automatically triggered each time an initial interface decision is made for a new time period.

In other worlds, in some embodiments the interface selection system 199 includes code and routines that are operable, when executed by the processor 125, to cause the processor 125 to make a "hybrid interface selection." A hybrid interface selection is a method for selecting an interface type which includes both (1) the initial interface decision and (2) the overriding interface decision.

In some embodiments, the interface selection system 199 of the vehicle 123 may be implemented using hardware including a field-programmable gate array ("FPGA") or an application-specific integrated circuit ("ASIC"). In some other embodiments, the interface selection system 199 may be implemented using a combination of hardware and software. The interface selection system 199 may be stored in a combination of the devices (e.g., servers or other devices), or in one of the devices.

The interface selection system 199 is described in more detail below following the description of the server 107, and with reference to FIGS. 1B, 1C, 2 and 3A-3B.

Server 107

In some embodiments, the server 107 is a cloud server that includes an interface optimizer system 194, a memory 127B, a processor 125B, and a communication unit 145B. The memory 127 stores any data needed for the interface optimizer system 194 to generate the aggregated data and the optimized data 188, and provide the optimized data 188 to the vehicle 123 via the network 105.

The following elements of the server 107 are the same or similar to those described above for the vehicle 123, and so, the descriptions of these elements will not be repeated here: the processor 125B; the memory 127B; and the communication unit 145B (except the communication unit 145B is not operable to be controlled by the interface selection system 199). The communication unit 145B handles communications between the server 107 and the vehicle 123 via the network 105.

The memory 127 of the server 107 stores one or more of the following elements: map data 177; aggregated data 179; and the optimized data 188. The optimized data 188 was described above with reference to the vehicle 123, and so, that description will not be repeated here. The probability data 190 described above with reference to the vehicle 123 is an element of the optimized data 188, and so, although not depicted in FIG. 1A as being an element of the server 107, in practice the probability data 190 is stored in the memory 127 of the server 107 as an element of the optimized data 188.

The aggregated data 179 is digital data which stores associated combinations of load data 189 and GPS data 186 which are received from a plurality of different vehicles 123. The communication unit 145 of the server 107 receives wireless messages from the network 105 which were transmitted to the server 107 by the communication units of a plurality of vehicles such as the vehicle 123. In some embodiments, the plurality of vehicles which transmit the wireless messages include the vehicle 123.

For example, a wireless message received by the server 107 includes: (1) load data 189 describing the channel loads measured for a plurality of different interface types made available to a vehicle by a communication unit of the vehicle; and (2) GPS data 186 which describes the geographical location of the vehicle when the channel loads described by the load data 189 where measured (in this way an instance of the GPS data 186 indirectly describes an instance of the load data 189). The GPS data 186 may be associated with the load data 189 which it indirectly describes, thereby creating a combination of load data 189 and GPS data 186. A single wireless message may include a plurality of combinations of load data 189 and GPS data 186 for the vehicle which transmitted the wireless message. The communication unit 145 of the server 107 receives a plurality of these wireless messages from a plurality of vehicles (which may include the vehicle 123 depicted in FIG. 1A) which are located in a plurality of different geographic locations and regions (as defined by the map data 177, which is described below). The communication unit 145 of the server 107 transmits these wireless messages to the interface optimizer system 194 as they are received. The interface optimizer system 194 includes code and routines that are operable, when executed by the processor 125 of the server 107, to generate the aggregated data 179 based on the digital data included in the plurality of wireless messages it receives from the communication unit 145 of the server 107. In this way, the aggregated data 179 describes a plurality of geographical locations and the channel loads for a plurality of different interface types as measured in the real-world. As described below, the interface optimizer system 194 includes code and routines that are operable, when executed by the processor 125 of the server 107, to statistically analyze the aggregated data 179 and the map data 177 to generate the optimized data 188 and a plurality of instances of probability data 190 included in the optimized data 188. The interface optimizer system 194 includes code and routines that are operable to cause the communication unit 145 of the server 107 to transmit the optimized data 188 to the vehicle 123. The vehicle 123 may then use then input its current GPS data 186 into the optimized data 188 to retrieve an instance of probability data 190 which corresponds to the current geographical location of the vehicle 123.

In some embodiments, the wireless messages received by the server 107 include one or more of the following types of digital data: the GPS data 186; the load data 189; and statistics of network traffic observed by the sensor set 155. The interface optimizer system 194 includes code and routines that are operable to generate the optimized data 188 (and the probability data 190 it includes) based on this digital data as received in a plurality of wireless messages transmitted by the plurality of different vehicles while present in a plurality of different geographic regions.

In some embodiments, the interface optimizer system 194 includes code and routines that are operable to update the optimized data 188 on a periodic basis and then cause the communication unit 145 of the server 107 to transmit the updated optimized data 188 to the vehicle 123 via the network 105.

In some embodiments, the sensor data 190 includes two components: (1) an interface selection vector, $S_j(t)$, for each geographical region, j; and (2) an expected channel load, $L_j(t)$, for each geographical region, j. The selection vector is expressed as "$S_j(t)=[p_{1,j}, p_{2,j}, \ldots, p_{n,j}]$," where "n" is the number of wireless interfaces available for a vehicle (such as vehicle 123) and i-th element $p_{i,j}$ represents a probability of sending packets by the i-th interface (e.g., interface "i"), "j" is the specific geographic region and "t" is a specific time frame. The expected channel load is expressed as "$L_j(t)=[l_{1,j}, l_{2,j}, \ldots, l_{n,j}]$," where the i-th element $l_{i,j}$ represents the expected channel load on the i-th interface (e.g., interface "i"), "j" is the specific geographic region and "t" is a specific time frame. The interface optimizer system 194 includes code and routines that are operable to cause the communication unit 145 of the server 107 to transmit the optimized data 188 to the vehicle 123 via the network 105.

In some embodiments, roadside units or WiFi access points are used to distribute the optimized data 188 to the vehicle 123 and other vehicles.

The map data 177 is digital data that describes an electronic map of one or more geographic areas where the one or more geographic areas are divided into non-overlapping geographic regions which are each identified in the electronic map by a unique region identifier (herein a "region identifier"). The map data 177 is used by the interface optimizer system 194 to generate instances of probability data 190 for the geographic regions included in the electronic map.

For example, the interface optimizer system 194 includes code and routines that are operable, when executed by the processor 125 of the server 107, to cause the processor 125 of the server 107 to execute steps including one or more of the following: (1) for a combination of GPS data 186 and load data 189, identify a region identifier for the combination by comparing the geographical location described by GPS data 186 to the map data 177 to identify a region identifier for a geographical region which includes the geographical location described by the GPS data 186; (2) associate the load data 189 for the combination in step 1 with the region identifier identified in step 1; (3) for particular region identifiers, repeat steps 1 and 2 until statistically significant samples of load data are acquired; and (4) statistically analyze the load data 189 for the particular region identifiers to generate instances of probability data 190 which describe the expected channel loads for the interface types of vehicles who are present in the geographic regions described by the particular region identifiers.

The interface optimizer system 194 includes code and routines that are operable, when executed by the processor 125 of the server 107, to cause the communication unit 145 of the server 107 to transmit the optimized data 188 to the vehicle 123 via the network 105.

In some embodiments, the interface selection system 199 includes code and routines that are operable, when executed by the processor 125 of the vehicle 123, to make an initial interface decision designating a particular interface type, k, as the interface which will be used to send and receive wireless messages during a current time period (i.e., a designated interval of time beginning with the current time, t, of the vehicle 123 which is described by the time data 185 or the GPS data 186). The particular interface type, k, is labeled or described by the interface selection system 199 as the "initial interface decision," and this label or description indicates that the particular interface type, k, is the "recommended network configuration" for the vehicle 123 while the vehicle 123 is present in the geographic region described by the region identifier.

In other words, analysis of the probability data 190 by the interface selection system 199 indicates that the particular interface type, k, is the best interface to use for a current time period based on the information included in the probability data 190 as determined by the interface optimizer system 194 of the server 107, and as such the communication unit 145 of the vehicle 123 should be configured to send and receive wireless messages using this particular interface type, k, and not the other interface types included in the plurality of different interface types. However, as described above, experience indicates that the particular interface type selected based on the probability data 190 may not always be the best interface type to use when compared to the other interface types included in the plurality of different interface types of the vehicle 123.

In some embodiments, the interface selection system 199 includes code and routines that are operable, when executed by the processor 125 of the vehicle 123, to retrieve: (1) load data 189 describing the measured channel loads, L', for the plurality of different interface types at a time which is the same as or cotemporaneous to the current time of the vehicle, t, which is described by the GPS data 186 or the time data 185; and (2) a threshold, $\beta I_{k,j}$, for the interface, k, which is described by the threshold data 184. See, for example, steps 315 and step 317 depicted in FIG. 3B.

In some embodiments, the load data 189 describe a channel busy ratio of interface i over the latest time frame t (e.g., "$\tilde{l}_i(t)$"), and the onboard unit 144 updates the average cannel load $l'_i$ on interface i as follows when measuring the load data 189: "$l'_i \leftarrow \alpha l'_i + (1-\alpha)\tilde{l}_i(t)$ ($0 \leq \alpha < 1$: constant)," where "$L' = [l'_1, l'_2, \ldots, l'_n]$." In these embodiments, the sensor data 190 includes two components: (1) an interface selection vector, $S_j(t)$ for each geographical region, j; and (2) an expected channel load, $L_j(t)$, for each geographical region, j. The selection vector is expressed as "$S_j(t) = [p_{1,j}, p_{2,j}, \ldots, p_{n,j}]$," where "n" is the number of wireless interfaces available for a vehicle (such as vehicle 123) and i-th element $p_{i,j}$ represents probability of sending packets by the i-th interface (e.g., interface "i"), "j" is the specific geographic region and "t" is a specific time frame. The expected channel load is expressed as "$L_j(t) = [l_{1,j}, l_{2,j}, \ldots, l_{n,j}]$," where the i-th element $l_{i,j}$ represents the expected channel load on the i-th interface (e.g., interface "i"), "j" is the specific geographic region and "t" is a specific time frame. The initial interface decision is made by the interface selection system 199 looking up the interface selection vector $S_j(t)$ for the current region j as indicated by the GPS data 186 of the vehicle 123, and designated an interface as the initial interface decision, say interface k, following the probabilities in $S_j(t)$. The interface selection system 199 then compares the expected channel load $L_j(t)$, as described by the probability data 190, and the local channel load L', as described by the load data 189, to decide if the initial interface decision is invalid. If the initial interface decision is determined to be invalid, then the interface selection system 199 selects an alternative interface, k, to use instead of interface i. For example, the interface selection system 199 analyzes the load data 189 and selects the k'-th interface from the plurality of different interfaces of the vehicle 123 with the following probability: "max (0, $(l'_{k'} - l_{k',j}(t))*d_{k'})/\Sigma_i$ max (0, $(l'_i - l_{i,j}(t))*d_i)$." In some embodiments, the probability is proportional to the residual channel resource with respect to the expected resource consumption on each interface of the plurality of different interfaces of the vehicle 123.

In some embodiments, the interface selection system 199 is an element of the onboard unit 144, and the onboard unit 144 is communicatively coupled to the communication unit 145 of the vehicle 123 and the onboard unit 144 includes one or more interfaces which are operable to measure the channel loads for the plurality of interfaces of the communication unit 145 of the vehicle 123.

In some embodiments, the interface selection system 199 includes code and routines that are operable, when executed by the processor 125 of the vehicle 123, to compare the measured channel loads for each of the plurality of different interface types (as described by the load data 189) to the expected channel loads, $L_j(t)$, for each of the plurality of different interface types (as described by the probability data 190) to determine the values for one or more of the following: (1) the excess resource, $I'_k$, for the interface, k, designated by the initial interface decision; (2) the residual resources for the interfaces which are not designated by the initial interface decision; (3) the summed total for the residual resources; and (4) the summed total for the excess resource(s). See, for example, FIG. 1C and step 317 depicted in FIG. 3B.

Referring again to FIG. 1A. In some embodiments, the interface selection system 199 includes code and routines that are operable, when executed by the processor 125 of the vehicle 123, to determine if both of the following are true: (1) the excess resource, $I'_k$, is greater than the threshold, $\beta I_{k,j}$, such that the excess resource exceeds the threshold; and (2) the summed total for the residual resources are greater than the summed total for the excess resource(s). If both of these statements are not true, then the interface, k, is used during the time period because the probability data 190 is determined by the interface selection system 199 to be sufficiently correct. If both of these statements are true, then the interface selection system 199 includes code and routines that are operable, when executed by the processor 125 of the vehicle 123, to cause the processor 125 of the vehicle 123 to make an overriding interface decision to select a different interface to use during the time period because, for example, the probability data 190 was determined by the interface selection system 199 to not be sufficiently correct. The selected interface is designated as the "overriding interface decision," which is a label that indicates that the selected interface will be used during the current time period instead of the interface which was labeled as the "initial interface decision."

In some embodiments, the interface selected as the overriding interface decision is the interface whose residual resource is greatest when compared to the other residual resources for the plurality of different interface types. See, for example, FIG. 1C. For example, in some embodiments the interface selection system 199 includes code and routines that are operable, when executed by the processor 125 of the vehicle 123, to cause the processor 125 of the vehicle 123 to compare the residual resources of the plurality of different interface types who have residual interfaces to make an overriding interface decision designating the interface having the greatest residual resource as the interface to be used to send and receive wireless messages during current time period. See, e.g., step 321 or sub-step 322 of FIG. 3B.

Figure 1B:
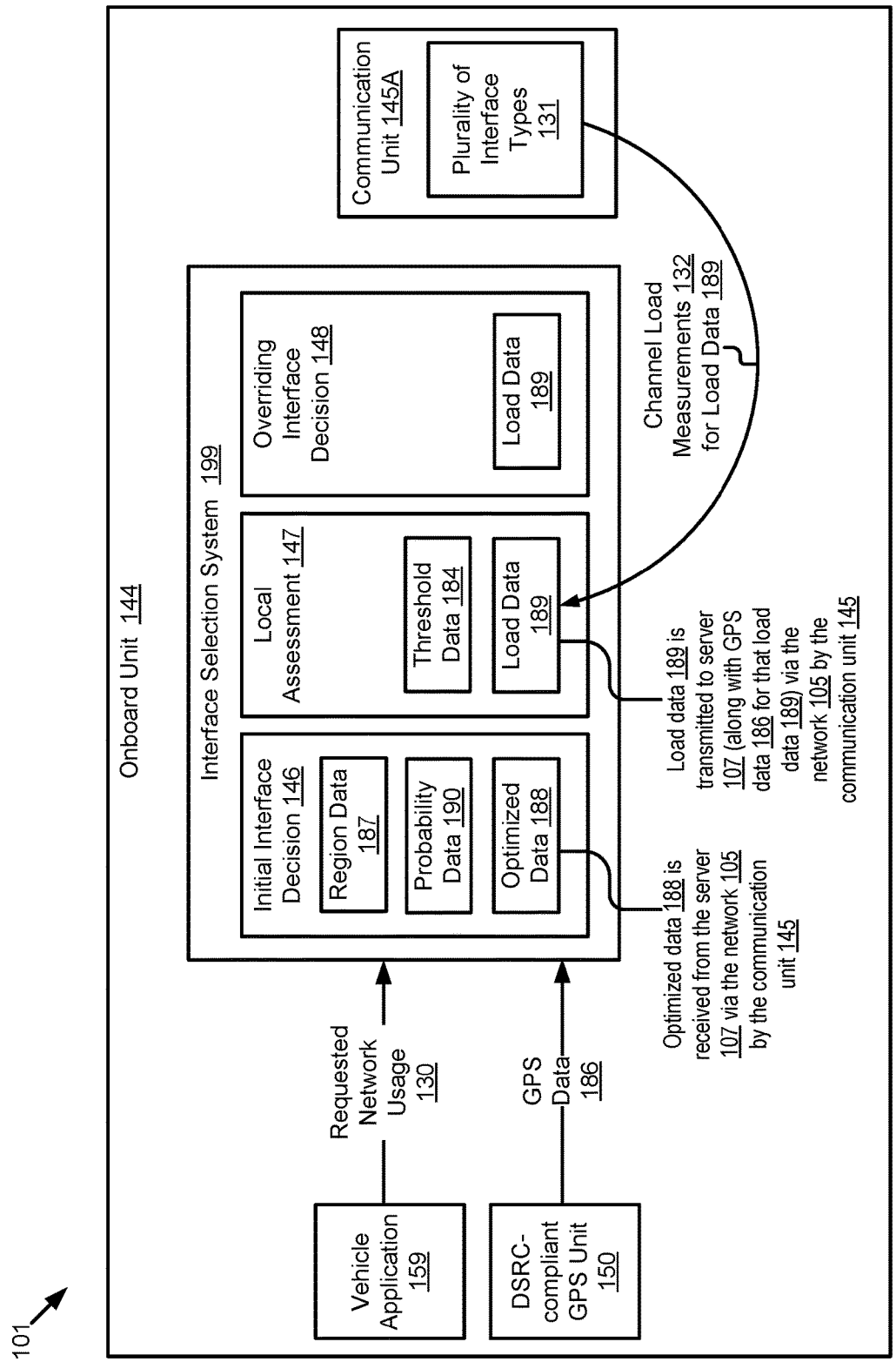
FIG. 1B is a block diagram illustrating a process flow chart for an interface selection system of a vehicle according to some embodiments.

Referring now to FIG. 1B, depicted is a block diagram illustrating a process flow chart 101 for an interface selection system 199 of a vehicle 123 according to some embodiments.

In the depicted embodiment, the interface selection system 199 is an element of the onboard unit 144.

In some embodiments, the vehicle application 159 provides a signal to the interface selection system 199 (or the onboard unit 144) including a requested network usage 130. For example, the vehicle application 159 requests to send or receive a wireless message via the network 105. The interface selection system 199 determines which interface type the communication unit 145 of the vehicle 123 will use to provide the requested network usage 130. The interface selection system 199 receives GPS data 186 from the DSRC-compliant GPS unit 150. The interface selection system 199 queries the region data 187 using the GPS data 186 to retrieve a region identifier corresponding to the geographical location described by the GPS data 186. The interface selection system 199 queries the optimized data 188 using the region identifier to retrieve the probability data 190 for the region identifier. The interface selection system 199 designates an interface type from the plurality of different interface types 131 provided by the communication unit 145 of the vehicle 123 as the initial interface decision 146 based on the probability data 190. For example, the interface selection system 199 designates the interface as the initial interface decision 146 because it is the interface from the plurality of interfaces having the lowest expected channel load based on the probability data 190.

In some embodiments, the interface selection system 199 makes a local assessment 147 of the initial interface decision 146. For example, the initial interface decision 146 retrieves the load data 189 and the threshold data 184 and assesses the initial interface decision 146 based on the load data 189 and the threshold data 184. See, e.g., FIG. 1C and steps 315, 317, 319 and 320 depicted in FIG. 3B. The load data 189 describes channel load measurements 132 for each of the plurality of different interface types measured at a time corresponding to the time value included in the GPS data 186, and, optionally, data rates measured for the plurality of different interface types measured at the time corresponding to the time value included in the GPS data 186.

In some embodiments, the interface selection system 199 designates an interface type from the plurality of different interface types 131 provided by the communication unit 145 of the vehicle 123 as the overriding interface decision 148 based on the load data 189. For example, the interface selection system 199 designates the interface as the overriding interface decision 148 because it is the interface from the plurality of interfaces having the maximum measured channel load based on the load data 189.

Figure 1C:
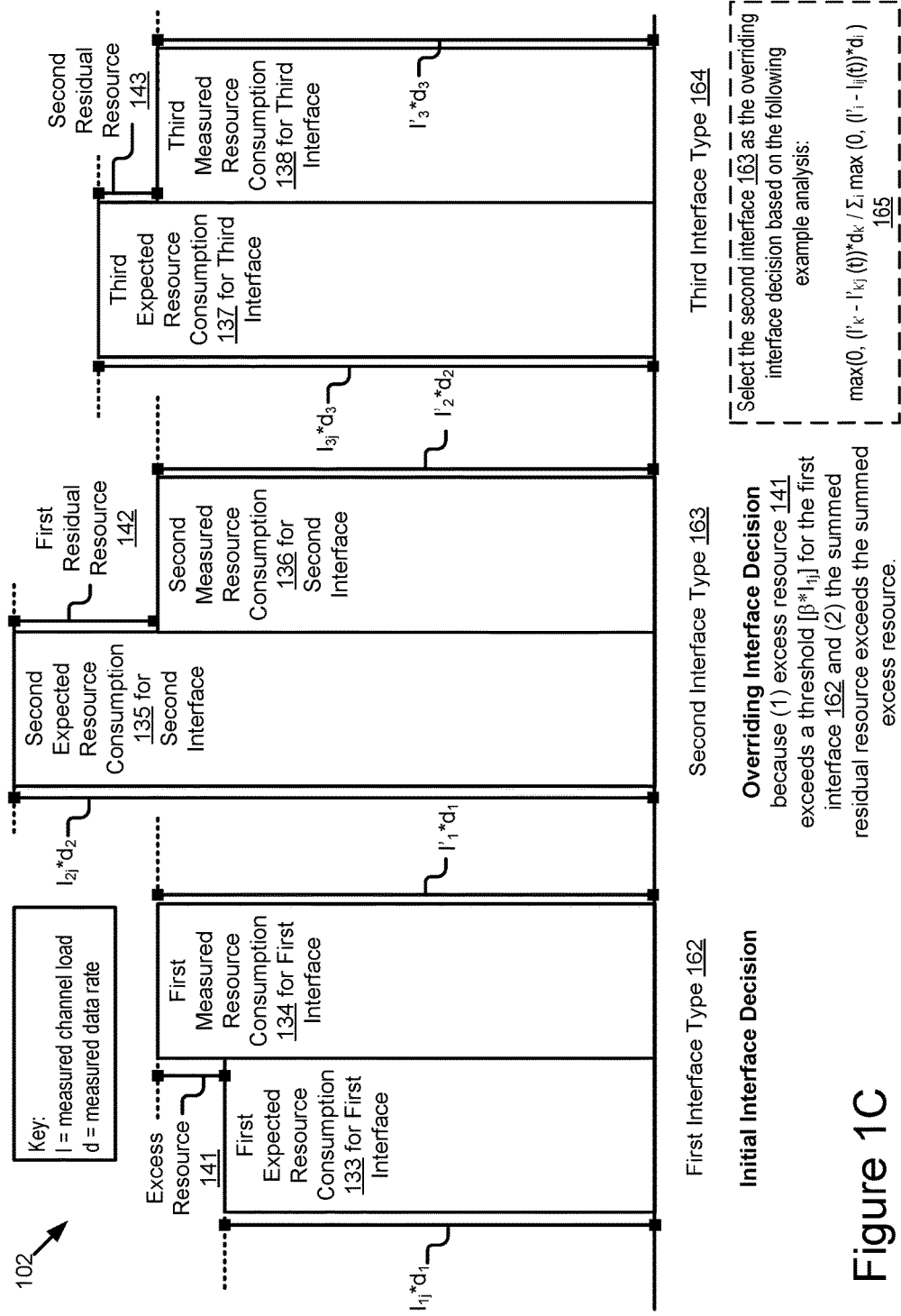
FIG. 1C is a block diagram illustrating analysis of an initial interface decision based on load data and selection of a different interface from that of the initial interface decision to designate as an overriding interface decision according to some embodiments.

Referring now to FIG. 1C, depicted is a block diagram illustrating an example analysis 102 of an initial interface decision 146 based on load data 189 and selection of a different interface from that of the initial interface decision 146 to designate as an overriding interface decision 148 according to some embodiments. For example, the interface selection system 199 includes code and routines that are operable, when executed by the processor 125 of the vehicle 123, to cause the processor 125 of the vehicle 123 to perform the analysis 102 depicted in FIG. 1C.

In some embodiments, the load data 189 is digital data that describes the measured resource consumption for the plurality of different interface types of the vehicle 123. In some embodiments, the measured resource function for a particular interface type is described by the load data 189 as a function of: (1) the measured channel load (I) for the particular resource type; and (2) the measured data rate, $d_i$, for the particular interface type, i. Each interface type, i, has its own measured channel load and its own measured data rate.

In some embodiments, the probability data 190 for a region, j, describes an expected channel load, $I_{ij}$, for each interface type, i, included in the plurality of different interface types. The expected channel load, $I_{ij}$, can then be multiplied by the measured data rate, $d_i$, for the particular interface type, i, to determine the expected resource consumption for the particular interface type, i.

For example, the interface selection system 199 includes code and routines that are operable, when executed by the processor 125 of the vehicle 123, to cause the processor 125 of the vehicle 123 to multiple, for each interface type included in the plurality of different interface types, the measured data rate, $d_i$, for a particular interface type, i, by the expected channel load, $I_{ij}$, for the particular interface type, i, as described by the probability data 190 for the current geographic region, j, to determine the expected resource consumption, $I_{ij}*d_i$, for the particular interface type, i, in the current geographic region, j.

The analysis 102 depicted in FIG. 1C considers a first interface type 162, a second interface type 163 and a third interface type 164, each of which are different from one another and collective form an example of a plurality of different interface types 131.

In the depicted embodiment, the analysis 102 for the first interface type 162 is based on: (1) a first expected resource consumption 133 for the first interface type 162, $I_{1j}*d_1$, where the first expected channel load for the first interface type 162, $I_{1j}$ is described by the probability data 190 for the current geographic region, j, and the first measured data rate for the first interface type 162, $d_1$, is described by the load data 189; and (2) a first measured resource consumption 134 for the first interface type 162, $I'_1*d_1$, as described by the load data 189, where $I'_1$ is the first measured channel load for the first interface type 162. The analysis 102 for the first interface type 162 identifies an excess resource 141. The excess resource 141 is a parameter that indicates that the first measured resource consumption 134 is greater in magnitude than the first expected resource consumption 133. In some embodiments, the excess resource 141 indicates that the first interface type 162 does not have enough bandwidth or load availability to be used for the current time period.

In the depicted embodiment, the analysis 102 for the second interface type 163 is based on: (1) a second expected resource consumption 135 for the second interface type 163, $I_{2j}*d_2$, where the second expected channel load for the second interface type 163, $I_{2j}$ is described by the probability data 190 for the current geographic region, j, and the second measured data rate for the second interface type 163, $d_2$, is described by the load data 189; and (2) a second measured resource consumption 136 for the second interface type 163, $I'_2*d_2$, as described by the load data 189, where $I'_2$ is the second measured channel load for the second interface type 163. The analysis 102 for the second interface type 163 identifies a first residual resource 142. The first residual resource 142 is a parameter that indicates that the second measured resource consumption 136 is less in magnitude than the second expected resource consumption 135. In some embodiments, the first residual resource 142 indicates that the second interface type 163 has more available resource than was indicated by the probability data 190 for the region, j.

In the depicted embodiment, the analysis 102 for the third interface type 164 is based on: (1) a third expected resource consumption 137 for the third interface type 164, $I_{3j}*d_3$, where the third expected channel load for the third interface type 164, $I_{3j}$ is described by the probability data 190 for the current geographic region, j, and the third measured data rate for the third interface type 164, $d_3$, is described by the load data 189; and (2) a third measured resource consumption 138 for the third interface type 164, $I'_3*d_3$, as described by the load data 189, where $I'_3$ is the third measured channel load for the third interface type 164. The analysis 102 for the third interface type 164 identifies a second residual resource 143. The second residual resource 143 is a parameter that indicates that the third measured resource consumption 138 is less in magnitude than the third expected resource consumption 137. In some embodiments, the second residual resource 143 indicates that the third interface type 164 has more available resource than was indicated by the probability data 190 for the region, j.

In the depicted embodiment, the interface selection system 199 includes code and routines that are operable, when executed by the processor 125 of the vehicle 123, to cause the processor 125 of the vehicle 123 to analyze the first expected resource consumption 133, the second expected resource consumption 135 and the third expected resource consumption 137, and then make an initial interface decision that the first interface type 162 is designated as the interface which will be used by the communication unit 145 of the vehicle 123 to send and receive wireless messages during a current time period, t, (i.e., a designated interval of time beginning with the current time, t, of the vehicle 123 which is described by the time data 185 or the GPS data 186) because, for example, the first expected resource consumption 133 is less than either the second expected resource consumption 135 or the third expected resource consumption 137.

In some embodiments, the interface selection system 199 includes code and routines that are operable, when executed by the processor 125 of the vehicle 123, to determine whether to make an overriding interface decision by executing steps that include: (1) determining a threshold value for the interface type designated as the initial interface decision; (2) comparing the threshold value to the excess resource 141 to determine if the excess resource 141 exceeds the threshold value; (3) determining a summed residual resource value by summing each of the residual resource values; (4) determining a summed excess resource value by summing each of the excess resource values [this step may be skipped if there is only one excess resource value]; and (5) comparing the summed residual resource values to the summed excess resource values [of comparing the summed residual resource values to the excess resource values if step 4 is skipped]. In some embodiments, if the following statements are true, then the interface selection system 199 determines that an overriding interface decision will be made: (1) the value for the excess resource 141 exceeds the value for the threshold, and (2) the summed residual resource value exceeds the summed excess resource value [or the summed residual resource value exceeds the excess resource value if step 4 is skipped].

In some embodiments, the threshold for a particular interface type is determine by multiplying the expected channel load for a particular interface type, as described by the probability data 190 for a particular geographical region, j, by a value for a system constant, $\beta$, which is described by the threshold data 184. For example, the interface selection system 199 includes code and routines that are operable, when executed by the processor 125 of the vehicle 123, to cause the processor 125 of the vehicle 123 to determine the threshold for the first interface type 162, which is designated as the initial interface decision, by multiplying the value for the system constant, $\beta$, which is described by the threshold data 184, by the expected channel load for the first interface type 162, $I_{1j}$, thereby yielding the threshold for the first interface type 162 in this particular region, $\beta * I_{1j}$.

In some embodiments, the interface selection system 199 includes code and routines that are operable, when executed by the processor 125 of the vehicle 123, to determine Analysis 165 of FIG. 1C depicts an example analysis that is used by the interface selection system 199 to determine which interface to select as the overriding interface decision according to some embodiments. For example, the interface selection system 199 includes code and routines that are operable, when executed by the processor of the vehicle 123, to designate a resource type as the overriding interface decision based on the analysis 165.

In some embodiments, the resource type having the greatest residual resource is designated as the overriding interface decision. For example, the interface selection system 199 includes code and routines that are operable, when executed by the processor of the vehicle 123, to designate a resource type as the overriding interface decision based that resource type having the greatest residual resource among the plurality of different interface types of the vehicle 123.

The vehicle 123 includes a sensor set 155 which generates sensor data and, in some embodiments, is a DSRC-equipped vehicle that can send and receive DSRC messages, including, for example, Basic Safety Messages, DSRC probes and other DSRC messages. In some embodiments, the interface selection system 199 determines that the initial interface decision in invalid based on additional factors than those described above, or using different factors than those described above. For example, in some embodiments these additional factors or different factors include digital data describing one or more of the following: the relative positions of one or more vehicles as indicated by the sensor data, GPS data or positional information which is included in Basic Safety Messages or other DSRC messages; the vehicle dynamics of one or more different vehicles, as described by the sensor data or the vehicle dynamics information which is included in Basic Safety Messages or other DSRC messages, the current time; the number of neighboring vehicles, as described by the sensor data or the vehicle dynamics information which is included in Basic Safety Messages or other DSRC messages; and any other data which is similar to, or a derivative of, these additional factors or different factors.

Example Computer System

Figure 2:
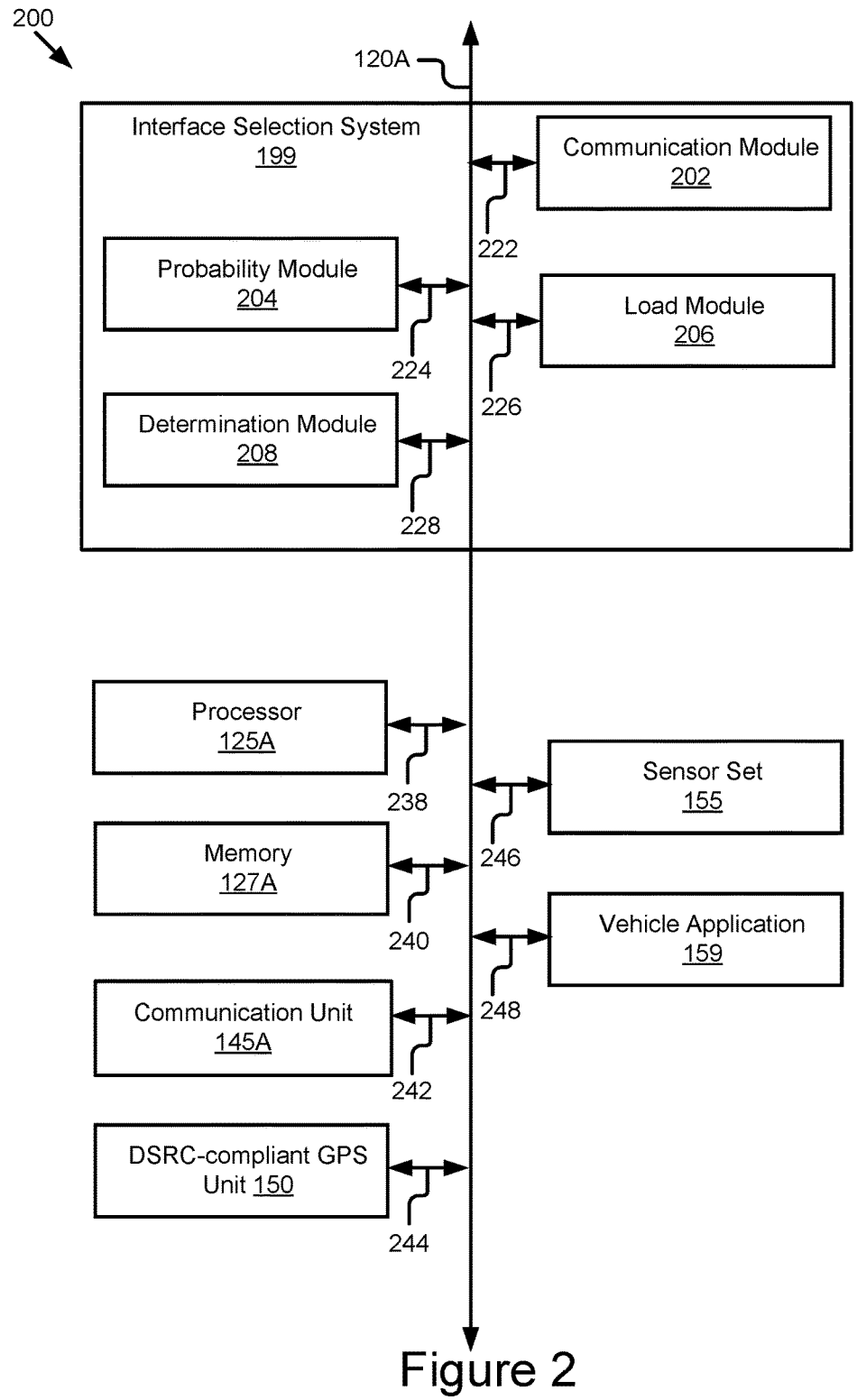
FIG. 2 is a block diagram illustrating an example computer system including the interface selection system of a vehicle according to some embodiments.

Referring now to FIG. 2, depicted is a block diagram illustrating an example computer system 200 including an interface selection system 199 according to some embodiments.

In some embodiments, the computer system 200 may include a special-purpose computer system that is programmed to perform one or more steps of a method 300 described below with reference to FIGS. 3A-3C.

In some embodiments, one or more components of the computer system 200 may be part of the server 107.

In some embodiments, the computer system 200 is an onboard vehicle computer of the vehicle 123.

In some embodiments, the computer system 200 is an onboard unit 144 of the vehicle 123.

In some embodiments, the computer system 200 is an ECU, head unit or some other processor-based computing device of the vehicle 123.

The computer system 200 may include one or more of the following elements according to some examples: the interface selection system 199; the processor 125; the memory 127; the communication unit 145; the DSRC-compliant GPS unit 150; the sensor set 155; and the vehicle application 159. The components of the computer system 200 are communicatively coupled by a bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The DSRC-compliant GPS unit 150 is communicatively coupled to the bus 120 via a signal line 244. The sensor set 155 are communicatively coupled to the bus 120 via a signal line 246. The vehicle application 159 are communicatively coupled to the bus 120 via a signal line 248.

The following elements of the computer system 200 were described above with reference to FIG. 1A, and so, those descriptions will not be repeated here: the processor 125; the memory 127; the communication unit 145; the DSRC-compliant GPS unit 150; the sensor set 155; and the vehicle application 159.

The memory 127 may store any of the data described herein. The memory 127 may store any data needed for the computer system 200 to provide its functionality.

As described above, the vehicle application 159 may include and ADAS system or an element of an ADAS system. Examples of an ADAS system may include one or more of the following: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In the illustrated embodiment shown in FIG. 2, the interface selection system 199 includes a communication module 202, a probability module 204, a load module 206, and a determination module 208.

The communication module 202 can be software including routines for handling communications between the interface selection system 199 and other components of the computer system 200. In some embodiments, the communication module 202 can be a set of instructions executable by the processor 125 to provide the functionality described below for handling communications between the interface selection system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, one or more of the following elements: the threshold data 184; the time data 185; the GPS data 186; the region data 187; the optimized data 188; the load data 189; and the probability data 190. The communication module 202 may send or receive any of the data or messages described above with reference to FIG. 1A, 1B or 1C, or below with reference to FIGS. 3A-3C, via the communication unit 145.

In some embodiments, the communication module 202 receives data from components of the interface selection system 199 and stores the data in the memory 127 (or a buffer or cache of the memory 127). For example, the communication module 202 receives any of the data described above with reference to the memory 127 from the communication unit 145 (via the network 105) and stores this data in the memory 127 (or a buffer or cache of the memory 127).

In some embodiments, the communication module 202 may handle communications between components of the interface selection system 199. For example, the communication module 202 may transmit optimized data 188 to the probability module 204 or load data 189 to the load module 206 or the determination module 208.

The probability module 204 can be software including routines for making an initial interface decision. In some embodiments, the probability module 204 can be a set of instructions executable by the processor 125 to provide the functionality described herein for making an initial interface decision. For example, the probability module 204 causes the DSRC-compliant GPS unit 150 to retrieve GPS data 186, retrieves the time data 185, determines if it time to make a new interface selection based on the current time described by the GPS data 186 (or the time data 185) and the time when the last interface selection was made as described by the time data 185, the retrieves a region identifier for the current geographic region, j, from the region data 187 based on the GPS data 186, retrieves the probability data 190 for the current geographic region from the optimized data 188 based on the region identifier, and analyzes the probability data 190 to make the initial interface decision. Optionally, the probability module 204 may make the initial interface decision after receiving load data 189 describing the measured data rate for each interface type from the load module 206 so that the initial interface decision is made based on expected values for the resource consumption of each of the interface types (see, e.g., FIG. 1C).

In some embodiments, the probability module 204 can be stored in the memory 127 of the computer system 200 and can be accessible and executable by the processor 125. The probability module 204 may be adapted for cooperation and communication with the processor 125 and other components of the computer system 200 via signal line 224.

The load module 206 can be software including routines for generating the load data 189. In some embodiments, the load module 206 can be a set of instructions executable by the processor 125 to provide the functionality described herein for generating the load data 189. In some embodiments, the load module 206 can be stored in the memory 127 of the computer system 200 and can be accessible and executable by the processor 125. The load module 206 may be adapted for cooperation and communication with the processor 125 and other components of the computer system 200 via signal line 226.

The determination module 208 can be software including routines for determining whether an overriding interface decision should be made and making the overriding interface decision. In some embodiments, the determination module 208 can be a set of instructions executable by the processor 125 to provide the functionality described herein for determining whether an overriding interface decision should be made and making the overriding interface decision. For example, the determination module 208 retrieves the threshold data 184, determines the threshold value for the interface designated as the initial interface decision, calculates the excess resource values and the residual resource values for each of the plurality of different interface types, determines whether the interface designated as the initial interface decision has an excess resource value, determines whether the excess resource value for the interface designated as the initial interface decision exceeds the threshold value for this interface; calculates a summed residual resource value; calculates a summed excess resource value (if more than one exists); determines whether the summed residual resource value exceeds the summed excess resource value (or whether the summed residual resource value exceeds the excess resource value if there is only one excess resource value); and then makes an overriding interface decision if (1) excess resource value exceeds the value for the threshold for the interface selected as the initial interface decision and (2) the summed residual resource value exceeds the summed excess resource value (or the summed residual resource value exceeds the excess resource value if there is only one excess resource value).

In some embodiments, the determination module 208 can be stored in the memory 127 of the computer system 200 and can be accessible and executable by the processor 125. The determination module 208 may be adapted for cooperation and communication with the processor 125 and other components of the computer system 200 via signal line 228.

Example Method

Figure 3A:
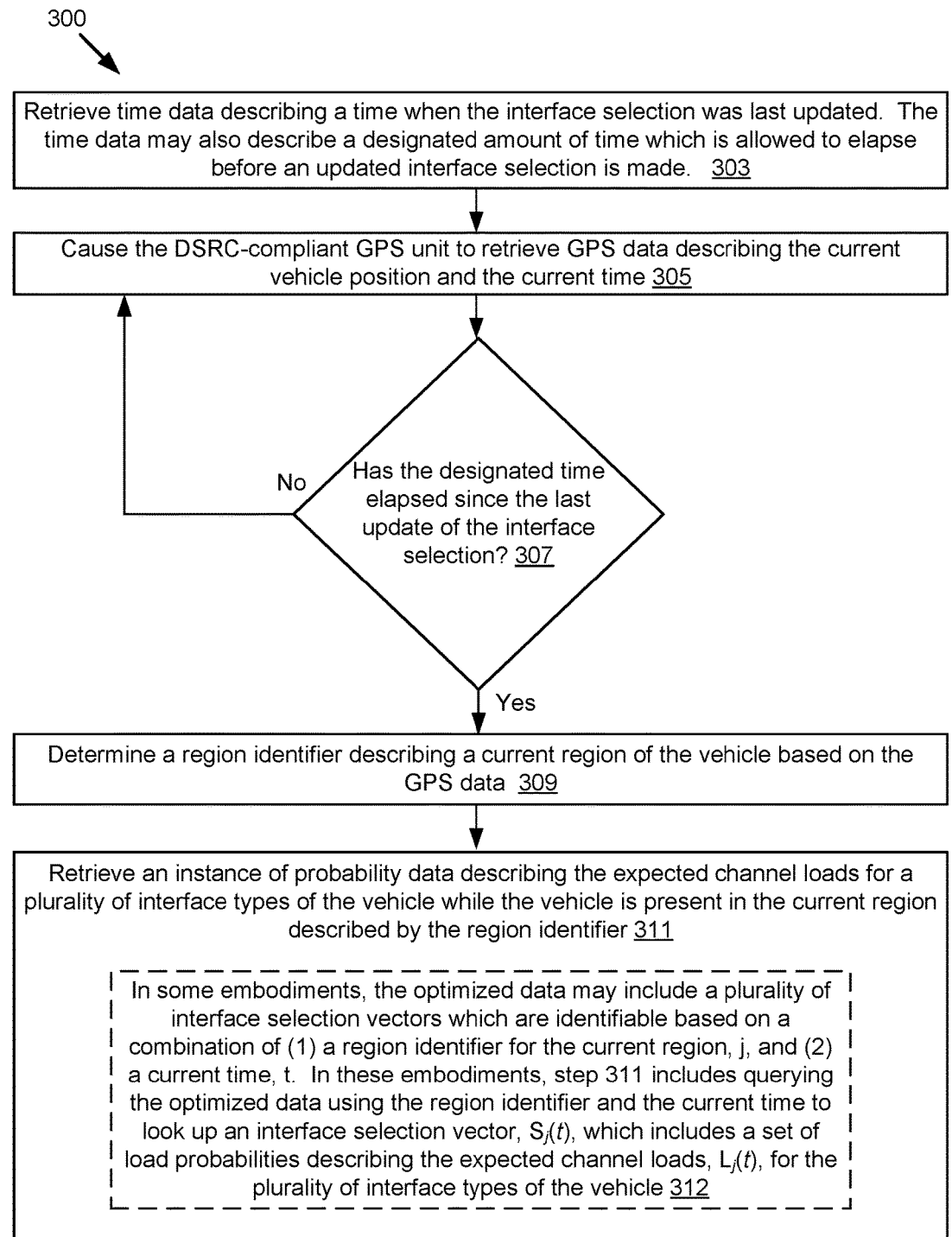
Figure 3B:
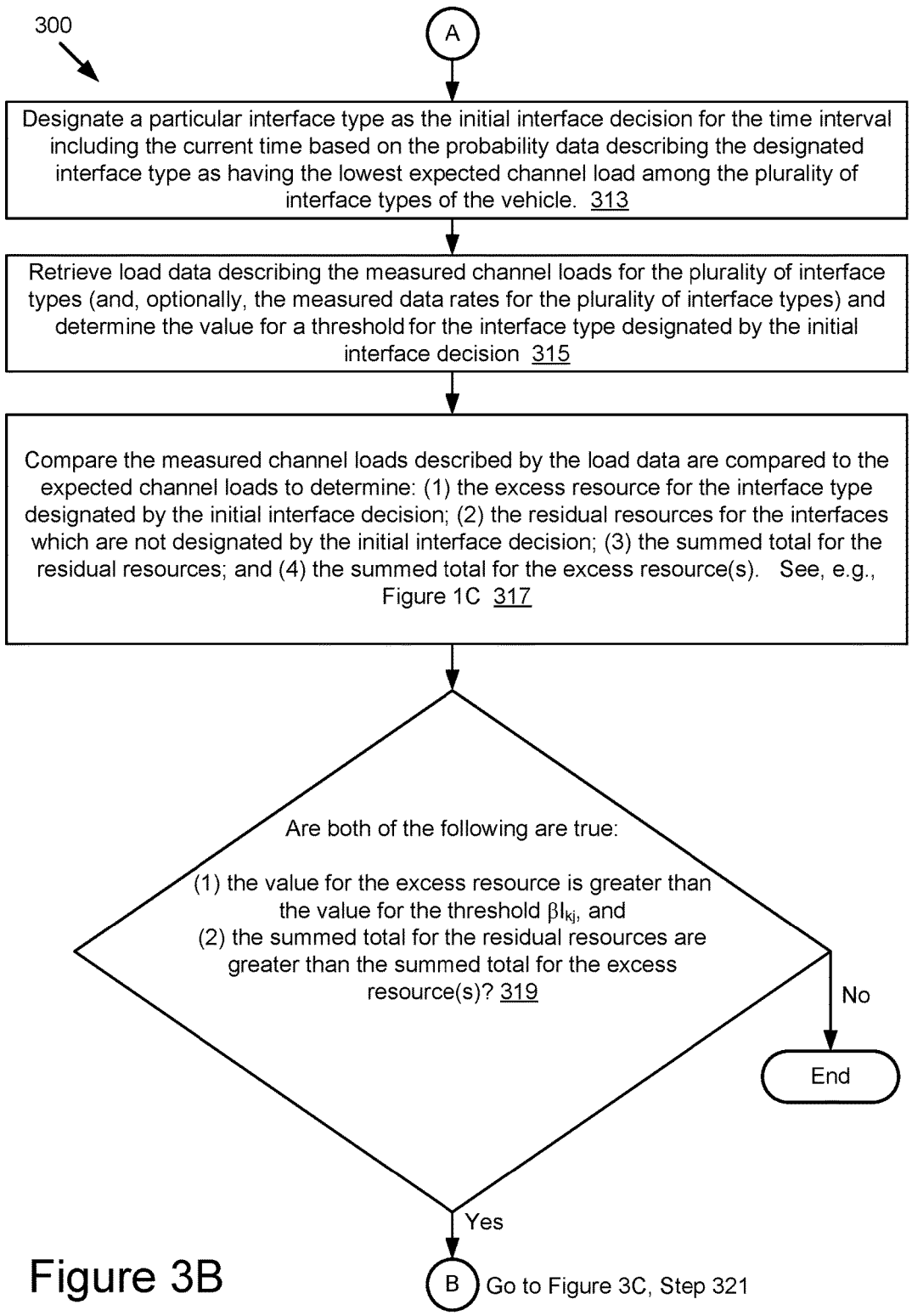

Referring now to FIGS. 3A-3C, depicted is an example flow diagram of a method 300 for making a hybrid interface selection based on (1) probability data describing past channel loads for a plurality of different interface types as experienced by a plurality of vehicles over an extended period of time (e.g., days, weeks, months, years, and not just a single instance as described by the time data 185 or the GPS data 186) and (2) load data 189 describing the current measured channel load for the plurality of different interface types of a particular vehicle, according to some embodiments.

One or more of the steps described herein for the method 300 may be executed by one or more computer systems 200.

Some steps or sub-steps of the method 300 refer to variables that are depicted in FIG. 1C.

Referring now to FIG. 3A. At step 303, time data describing a time when the interface selection was last updated is retrieved. The time data may also describe a designated amount of time which is allowed to elapse before an updated interface selection is made. At step 305, instructions are sent to the DSRC-compliant GPS unit to cause it to retrieve GPS data describing the current vehicle position and the current time, t, for the vehicle. At step 307, a determination is made regarding whether the designated time has elapsed since the last update of the interface selection. If the designated time is determined to have not elapsed at step 307, then the method 300 returns to step 305. If the designated time is determined to have elapsed at step 307, then the method 300 proceeds to step 309.

At step 309, a region identifier describing a current geographic region of the vehicle is determined based on the GPS data. For example, region data is queried using the GPS data to retrieve a region identifier from the region data. The region identifier describes the current geographic region of the vehicle based on the current geographical location of the vehicle as described by the GPS data.

At step 311, an instance of probability data describing the expected channel loads for a plurality of different interface types of the vehicle while the vehicle is present in the region described by the region identifier. For example, optimized data is queried using (1) the region identifier for the current geographic region, j, and (2) the current time, t, to retrieve probability data describing the expected channel loads, $L_j(t)$, for the plurality of different interface types of the vehicle while the vehicle is present in the current geographic region.

Step 311 includes an optional sub-step 312. The optional sub-step 312 is an example embodiment for executing step 311. In some embodiments, the optimized data may include digital data describing a plurality of interface selection vectors which are identifiable based on a combination of: (1) a region identifier for the current geographic region, j; and (2) a current time, t. In these embodiments, step 311 includes querying the optimized data using the region identifier and the current time to look up an interface selection vector, $S_j(t)$, which includes a set of load probabilities describing the expected channel loads, $L_j(t)$, for the plurality of different interface types of the vehicle.

Referring now to FIG. 3B. At step 313, a particular interface type from the plurality of different interface types of the vehicle is designated as the initial interface selection for the time interval including the current time because the probability data indicates that the designated interface has the lowest expected channel load for the plurality of different interface types of the vehicle. For example, a particular interface type interface type, k, is designated as the initial interface decision for the time interval including the current time, t, based on the probability data describing the expected channel loads for each of the plurality of interfaces, LA), while the vehicle is present in this particular region, j.

At step 315, load data describing the measured channel loads for the plurality of interfaces (and, optionally, the measured data rates for the plurality of different interface types) is retrieved and the value for a threshold for the interface type, k, designated by the initial interface decision is determined. For example, load data describing the measured channel loads for the plurality of different interface types (and, optionally, the measured data rates for the plurality of different interface types) is measured by the onboard unit and the value for a threshold, $\beta I_{kj}$, for the interface type, k, designated by the initial interface decision is determined based on the system constant $\beta$ described by the threshold data and the measured channel load, $I_{kj}$, for the interface type, k.

At step 317, the measured channel loads described by the load data are compared to the expected channel loads to determine: (1) the excess resource for the interface type designated by the initial interface decision; (2) the residual resources for the interfaces which are not designated by the initial interface decision; (3) the summed total for the residual resources; and (4) the summed total for the excess resource(s).

For example, the measured channel loads, L', for each of the plurality of different interface types is compared to the expected channel loads, $L_j(t)$, for each of the plurality of different interface types to determine the values for: (1) the excess resource for the interface, k, designated by the initial interface decision; (2) the residual resources for the interfaces which are not designated by the initial interface decision; (3) the summed total for the residual resources; and (4) the summed total for the excess resource(s).

At step 319, a determination is made regarding whether both of the following statements are true: (1) the value for the excess resource is greater than the value for the threshold $\beta I_{kj}$; and (2) the summed total for the residual resources are greater than the summed total for the excess resource(s). If these statements are not both true, then the method 300 ends and the interface type, k, is used to send and receive wireless messages for the time interval including the current time, t. If they are not both true, then the method proceeds to step 321.

In some embodiments, step 319 includes a determination regarding whether both of the following statements are true: (1) the excess resource, $I'_k$, is greater than the threshold $\beta I_{kj}$, and (2) the summed total for the residual resources are greater than the summed total for the excess resource(s). This analysis may be expressed as "Is $I'_k > \beta I_{kj}(t)$ and $\Sigma(I'_i - I_{ij}(t))*d_i > 0$ true, where $d_i$ is the data rate of an interface, i."

Referring to FIG. 3C. At step 321, the measured channel loads are analyzed to designate a different interface as the overriding interface decision. In some embodiments, the interface type designated as the overriding interface decision is the interface type whose residual resource is greatest when compared to the residual resources of the other interface types included in the plurality of different interface types (or whose channel load is least when compared to the channel loads of the other interface types included in the plurality of different interface types).

In some embodiments, the analysis of step 321 may be expressed in the following way:

$$\max(0,(I'_k-I'_{k'j}(t))*d_{k'}/\Sigma_i\max(0,(I'_i-I_{ij}(t))*d_i)$$

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a vehicle including a plurality of different interface types for sending and receiving wireless messages for a first time period, the method comprising:
analyzing, by a processor of the vehicle, probability data describing a set of expected channel loads for the plurality of different interface types of the vehicle to make an initial interface decision to designate a first interface type from the plurality of different interface types as an interface type to use for sending and receiving wireless messages during the first time period;
determining that the initial interface decision is invalid by analyzing load data describing a set of measured channel loads for the plurality of different interface types wherein the analysis of the load data indicates that the initial interface decision is invalid because a measured channel load for the first interface type is greater than an expected channel load for the first interface type by a value that exceeds a threshold amount for the value; and
responsive to the initial interface decision being determined to be invalid, analyzing the load data to make an overriding interface decision to designate a second interface type from the plurality of different interface types as the interface type to use for sending and receiving wireless messages during the first time period.

2. The method of claim 1, wherein the probability data is determined by a computer system which is not an element of the vehicle based on past channel loads for the plurality of different interface types as experienced by a plurality of different vehicles over a second time period which does not include the first time period.

3. The method of claim 2, wherein the set of measured channel loads are measured during the first time period which is not included in the second time period.

4. The method of claim 1, wherein each step of the method is executed by an onboard unit of the vehicle which includes the processor.

5. The method of claim 1, wherein the threshold amount for the value is variable based on a current geographical location of the vehicle.

6. The method of claim 1, wherein the probability data is variable based on a current geographical location of the vehicle.

7. The method of claim 1, wherein each step of the method is executed consecutively.

8. The method of claim 1 further comprising transmitting a wireless message to an endpoint using the second interface type during the first time period.

9. A system comprising:
an onboard unit of a vehicle including a non-transitory memory storing computer code which, when executed by the onboard unit causes the onboard unit to:
analyze probability data describing a set of expected channel loads for a plurality of different interface types of the vehicle to make an initial interface decision to designate a first interface type from the plurality of different interface types of the vehicle as an interface type to use for sending and receiving wireless messages during a first time period;
determine that the initial interface decision is invalid by analyzing load data describing a set of measured channel loads for the plurality of different interface, wherein the analysis of the load data indicates that the initial interface decision is invalid because a measured channel load for the first interface type is greater than an expected channel load for the first interface type by a value that exceeds a threshold amount for the value; and
analyze the load data to make an overriding interface decision to designate a second interface type from the plurality of different interface types of the vehicle as the interface type to use for sending and receiving wireless messages during the first time period.

10. The system of claim 9, wherein the probability data is determined by a computer system which is not an element of the vehicle based on past channel loads for the plurality of different interface types as experienced by a plurality of different vehicles over a second period of time which does not include the first time period.

11. The system of claim 10, wherein the set of measured channel loads are measured during the first time period which is not included in the second period of time.

12. The system of claim 10, wherein the computer system is a server which is communicatively coupled to the vehicle by a network and the server periodically updates the probability data.

13. The system of claim 9, wherein the threshold amount for the value is variable based on a current geographical location of the vehicle.

14. The system of claim 9, wherein the probability data is variable based on a current geographical location of the vehicle.

15. The system of claim 9 further comprising transmitting a wireless message to an endpoint using the second interface type during the first time period.

16. A computer program product comprising a non-transitory memory of an onboard vehicle computer system of a vehicle storing computer-executable code that, when executed by the onboard vehicle computer system, causes the onboard vehicle computer system to:
analyze probability data describing a set of expected channel loads for a plurality of different interface types of the vehicle to make an initial interface decision to designate a first interface type from the plurality of different interface types of the vehicle as an interface type to use for sending and receiving wireless messages during a first time period;

determine that the initial interface decision is invalid by analyzing load data describing a set of measured channel loads for the plurality of different interface types of the vehicle, wherein the analysis of the load data indicates that the initial interface decision is invalid because a measured channel load for the first interface type is greater than an expected channel load for the first interface type by a value that exceeds a threshold amount for the value; and analyze the load data to make an overriding interface decision to designate a second interface type from the plurality of different interface types of the vehicle as the interface type to use for sending and receiving wireless messages during the first time period.

17. The computer program product of claim 16, wherein the probability data is determined by a computer system which is not an element of the vehicle based on past channel loads for the plurality of different interface types as experienced by a plurality of different vehicles over a second time period which does not include the first time period.

18. The computer program product of claim 17, wherein the set of measured channel loads are measured during the first time period which is not included in the second time period.

19. The computer program product of claim 17, wherein the computer system is a server which is communicatively coupled to the vehicle by a network and the server periodically updates the probability data.

20. The computer program product of claim 16, wherein the probability data is variable based on a current geographical location of the vehicle.

* * * * *